United States Patent
McDonnell et al.

(10) Patent No.: US 8,463,663 B2
(45) Date of Patent: Jun. 11, 2013

(54) STORAGE OF PURCHASE-RELATED INFORMATION

(75) Inventors: James Thomas Edward McDonnell, Bristol (GB); Huw Robson, Cheddar (GB); Maurizio Pilu, Bristol (GB); Richard Anthony Lawrence, Chipping Sodbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 11/258,096

(22) Filed: Oct. 26, 2005

(65) Prior Publication Data

US 2006/0106719 A1 May 18, 2006

(30) Foreign Application Priority Data

Oct. 29, 2004 (GB) .................................... 0424164.2

(51) Int. Cl.
*G06Q 10/087* (2006.01)
(52) U.S. Cl.
USPC ................... 705/28; 705/26; 705/27; 705/14; 705/50; 705/23; 705/22; 705/64; 705/31; 705/1; 705/59; 235/385; 235/435; 235/439; 235/375; 235/440; 235/462; 235/492
(58) Field of Classification Search
USPC .......................................................... 705/28
See application file for complete search history.

(56) References Cited

U.S. PATENT DOCUMENTS

| | | | |
|---|---|---|---|
| 5,555,297 A | | 9/1996 | Ochy |
| 5,918,213 A | | 6/1999 | Bernard |
| 5,963,133 A | * | 10/1999 | Monjo ........................ 340/572.1 |
| 6,226,619 B1 | | 5/2001 | Halperin |
| 6,246,326 B1 | | 6/2001 | Wiklof et al. |
| 6,473,739 B1 | | 10/2002 | Showghi et al. |
| 6,512,919 B2 | | 1/2003 | Ogasawara |
| 6,611,673 B1 | | 8/2003 | Bayley et al. |
| 6,996,543 B1 | * | 2/2006 | Coppersmith et al. .......... 705/50 |
| 7,290,715 B2 | | 11/2007 | Sellen et al. |
| 7,426,482 B2 | * | 9/2008 | Inami et al. ................ 705/26.82 |
| 2002/0147645 A1 | | 10/2002 | Alao et al. |
| 2003/0006281 A1 | * | 1/2003 | Thomas et al. ............... 235/385 |
| 2003/0119447 A1 | | 6/2003 | Fisher et al. |
| 2004/0134994 A1 | * | 7/2004 | Zaba et al. .................... 235/492 |
| 2004/0203944 A1 | | 10/2004 | Huomo et al. |
| 2004/0254843 A1 | | 12/2004 | Koch |

(Continued)

FOREIGN PATENT DOCUMENTS

| | | |
|---|---|---|
| EP | 1422658 A2 | 5/2004 |
| GB | 2370942 A | 7/2002 |

(Continued)

OTHER PUBLICATIONS

Harrop, Peter. Smart labels in the pharmaceutical industry. Sep. 2001, Pharmaceutical Technology Europe, Edition 3, vol. 9, p. 54.*

(Continued)

*Primary Examiner* — F. Zeender
*Assistant Examiner* — Fawaad Haider

(57) ABSTRACT

A memory tag is a transponder device with a memory for storing digital content. Purchase-related information for a product is stored in such a memory tag. A write capability of the memory tag is disabled.

19 Claims, 5 Drawing Sheets

U.S. PATENT DOCUMENTS

| | | |
|---|---|---|
| 2005/0070259 A1 | 3/2005 | Kloba et al. |
| 2005/0178832 A1 | 8/2005 | Higuchi |
| 2005/0234778 A1* | 10/2005 | Sperduti et al. ............. 705/22 |
| 2006/0004675 A1 | 1/2006 | Bennett et al. |
| 2006/0095287 A1 | 5/2006 | Slatter |
| 2006/0095342 A1 | 5/2006 | Pilu et al. |
| 2006/0106719 A1 | 5/2006 | McDonnell et al. |

FOREIGN PATENT DOCUMENTS

| | | |
|---|---|---|
| JP | 2003022391 | 1/2003 |
| JP | 2003316871 | 11/2003 |
| JP | 2004030147 | 1/2004 |
| JP | 2004272344 | 9/2004 |

OTHER PUBLICATIONS

Final Office Action issued on Mar. 19, 2009 for U.S. Appl. No. 11/258,352, filed Oct. 26, 2005, 24 pages.
Non-Final Office Action issued on Jul. 23, 2009 for U.S. Appl. No. 11/258,352, filed Oct. 26, 2005, 35 pages.
UK Intellectual Property Office, Application No. GB 0424164.2, Examination Report dated May 26, 2010 (7 pages).
U.S. Appl. No. 11/258,352, Examiner's Answer dated Aug. 19, 2010 (31 pages).
Examiner's Answer issued on Nov. 23, 2012 for U.S. Appl. No. 11/258,044, filed Oct. 26, 2005, 8 pages.
Final Office Action issued on Jan. 26, 2010 for U.S. Appl. No. 11/258,352, filed Oct. 26, 2005, 29 pages.
Final Office Action issued on Jul. 22, 2010 for U.S. Appl. No. 11/258,044, filed Oct. 26, 2005, 12 pages.
Final Office Action issued on Jul. 27, 2009, for U.S. Appl. No. 11/258,096, filed Oct. 26, 2005, 8 pages.
Final Office Action issued on Mar. 8, 2012 for U.S. Appl. No. 11/258,044, filed Oct. 26, 2005, 11 pages.
Non-Final Office Action issued on Feb. 5, 2009 for U.S. Appl. No. 11/258,096, filed Oct. 26, 2005, 9 pages.
Non-Final Office Action issued on Jul. 23, 2009 for U.S. Appl. No. 11/258,352, filed Oct. 26, 2005, 34 pages.
Non-Final Office Action issued on Mar. 2, 2010 for U.S. Appl. No. 11/258,044, filed Oct. 26, 2005, 10 pages.
Non-Final Office Action issued on Nov. 16, 2009 for U.S. Appl. No. 11/258,044, filed Oct. 26, 2005, 10 pages.
Non-Final Office Action issued on Sep. 20, 2011 for U.S. Appl. No. 11/258,044, filed Oct. 26, 2005, 10 pages.
Non-Final Office Action issued on Sep. 22, 2008 for U.S. Appl. No. 11/258,352, filed Oct. 26, 2005, 19 pages.
UK Intellectual Property Office, Application No. GB 0424150.1, Examination Report dated Sep. 17, 2008 (3 pages).
UK Intellectual Property Office, Application No. GB 0424150.1, Search Report dated Mar. 22, 2005 (4 pages).
UK Intellectual Property Office, Application No. GB 0424160.0, Search Report dated Mar. 24, 2005 (4 pages).
UK Intellectual Property Office, Application No. GB 0424164.2, Examination Report dated Dec. 3, 2009 (6 pages).
UK Intellectual Property Office, Application No. GB 0424164.2, Search Report dated Feb. 1, 2005 (3 pages).

* cited by examiner

STORAGE OF PURCHASE-RELATED INFORMATION

FIELD OF THE INVENTION

The invention relates to the storage of purchase-related information, such as purchase receipts and product warranties.

BACKGROUND TO THE INVENTION

Storage of purchase-related information, such as purchase receipts and product warranties, provides difficulties for product owners. Such documentation is conventionally provided in paper form, often in the form of fragile till receipts, and is difficult to maintain effectively. Claiming against receipts and warranties typically requires a painstaking manual checking process. It is desirable to provide an arrangement for handling such information which provides advantages for at least one of product owners, retailers and warrantors.

SUMMARY OF THE INVENTION

In one aspect, the invention provides a memory tag being a transponder device with a memory for storing digital content, the memory having stored therein purchase-related information for a product, wherein a write capability of the memory tag is disabled.

DESCRIPTION OF DRAWINGS

Specific embodiments of the invention will now be described, by way of example, with reference to the accompanying drawings, of which.

DESCRIPTION OF SPECIFIC EMBODIMENTS

Figure 1:
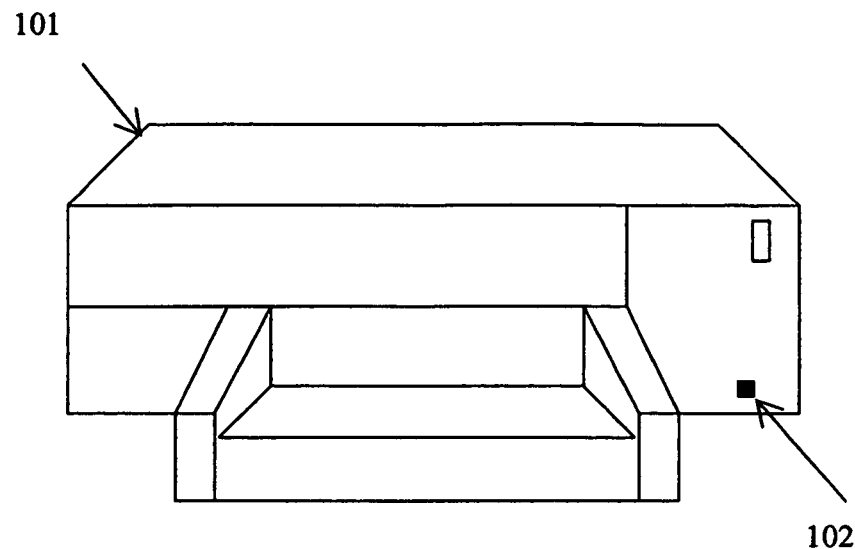
FIG. 1 shows an object with an integral memory tag suitable for use for embodiments of the invention.

FIG. 1 shows an object with an integral memory tag suitable for use for embodiments of the invention. The object in this case is printer 101, and the memory tag 102 is disposed to be an integral part of the printer (an "integral part" is considered to be either formed integrally with or permanently fixed to the printer or one of its component parts). It will be appreciated that essentially any object in which a memory tag can be included or to which a memory tag can be attached can be considered in this context. Use of such a memory tag in accordance with embodiments of the invention is discussed below A suitable memory tag will first be described. Incorporation of a memory tag within an object will be discussed briefly thereafter. Processes involved in storing purchase-related information within such a memory tag, and in subsequently using such purchase-related information (in the example of making a warranty claim) are also discussed.

A memory tag may be generally considered as a transponder device with significant memory—sufficient to store significant digital content rather than just identifier data—and an exemplary device of this kind is described below. The type of memory tag discussed here is designed to be read by a suitable reader device at close range and to provide rapid data transmission—data can thus be read by "brushing" the reader device across the memory tag.

The schematics of a suitable memory tag will be described in FIG. 2. Circuitry for such a tag and for a suitable reader will be described in FIG. 3. The memory tag described below is adapted so that data can be not only read from it by the reader, but also so that data can be written to it. Schematics of a memory tag suitable for a further specific embodiment of the invention are provided in FIG. 4.

Figure 2:
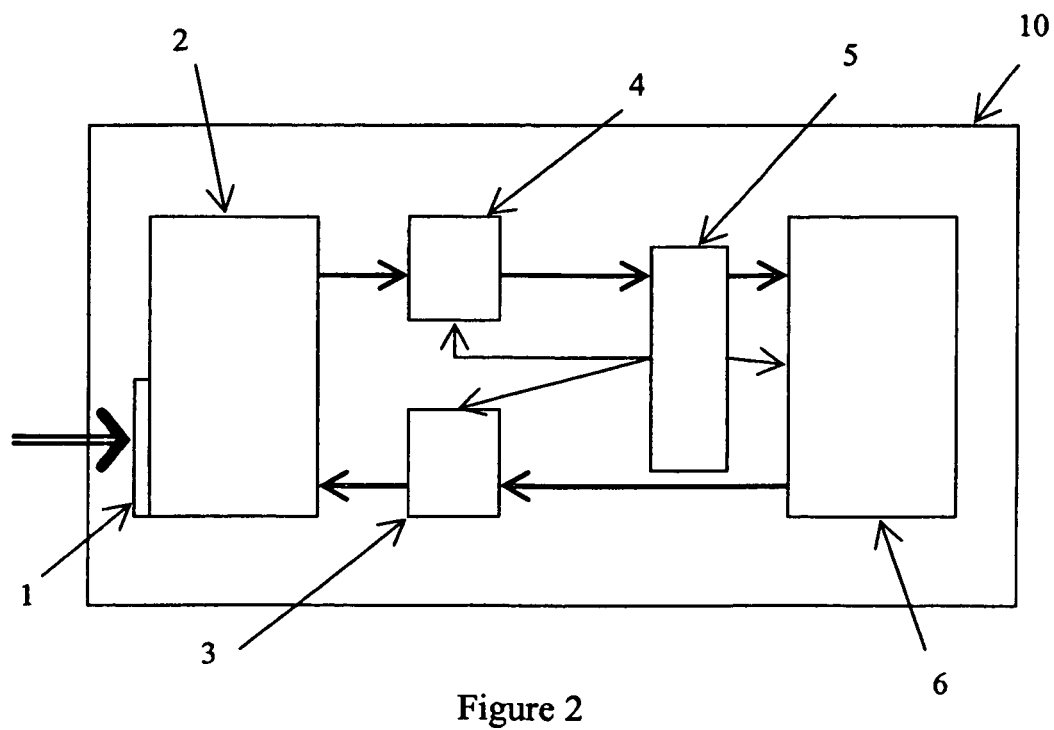
FIG. 2 shows schematically the elements of a memory tag suitable for use in embodiments of the invention.

The elements of an RFID-like memory tag 10 are shown in FIG. 2. Such a tag is inductively powered by an RF signal received from a reader, and is also read by and (in relevant embodiments) written to by such a reader (strictly, reader/writer) device. The memory tag contains an antenna 1 to receive signal from the reader device and transponder circuitry 2 to extract power from the received signal to power the memory tag and to receive data from a read data circuit 3 to allow data to be provided from the tag memory 6 by varying a resonant circuit of the transponder circuitry 2. A write data circuit 4 is provided to detect data to be written to the tag memory 6 and also for control data to be provided to the memory tag—detected data is provided to control logic 5. Control logic 5 is provided to control the operations of the memory tag in response to the signals received from the reader device.

Depending on the nature of the memory tag, Control logic 5 can vary very considerably in complexity. For a tag which, once manufactured, can only be read and not written to, control logic 5 need not exist—the tag may be adapted simply so that when it is powered up, it simply transmits its content from beginning to end repeatedly until it is no longer powered. Any greater level of complexity requires some logic—for example, a read-only tag may initially return only a first set of data, but would be responsive to a specific signal from the reader to return a second set of data instead (for example, from a list of choices provided in the first set of data). Similarly, a tag which can be both read and written to requires sufficient control logic such that the reader can prepare the tag to receive data for writing to the tag memory and to stop such writing (for example, by providing an "end of data" signal or by specifying the number of bits of data to be written in advance). Where more complex operation is required from the memory tag, control logic 5 may be a suitable processor (this is discussed further with reference to FIG. 4).

Figure 3:
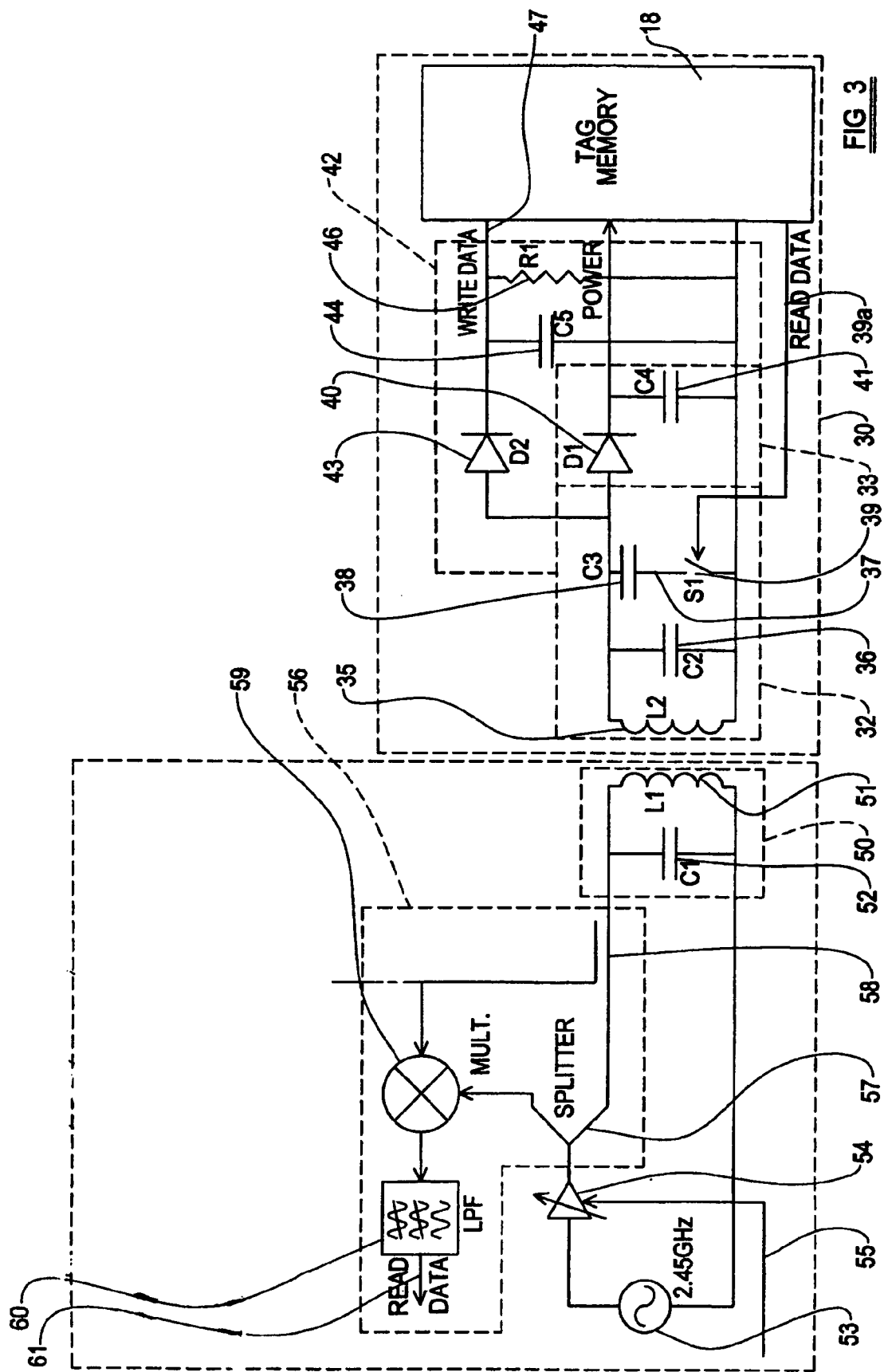
FIG. 3 shows circuitry for the memory tag of FIG. 2 and for a suitable reader device.

FIG. 3 shows an exemplary memory tag 30, though without indicating control circuitry (which may for these purposes be considered as part of the tag memory block 18), together with a reader (or reader/writer) device 31. The tag 30 comprises a resonant circuit part 32 and a rectifying circuit part 33, together with a memory 18. The resonant circuit part 32 comprises an inductor L2 35 and a capacitor C2 36 connected in parallel The resonant circuit part 32 further comprises a controllable capacitive element generally indicated at 37, in the example of FIG. 3 comprising a capacitor C3 38 and a switch S1 39 which is connected to a read data line 39a connected to the memory 36 to modulate the resonant frequency of the resonant circuit part 32. The rectifying part 33 comprises a diode D1 40 connected to the resonant circuit part 32 in a forward biased direction and a capacitor C4 41 connected in parallel with the components of the resonant circuit part 32. The rectifying circuit part 33 operates as a half-wave rectifier to provide power to the memory 18. The tag 30 further comprises a write data circuit part 42. The write data circuit part 42 comprises a diode D2 43 connected in the forward bias direction to the output of the resonant circuit part 32, with a capacitor C5 44 and a resistor R1 46 connected in parallel with the components of the resonant circuit part 32. The write data circuit part 42 in this case comprises a simple envelope detector which is responsive to the magnitude of the signal generated by the resonant circuit part 32, and provides a write data signal on a line 47 to the memory 18. For these purposes such "write data" may include control data, and control logic is considered as lying within the element denoted as memory 18.

The read/write device 31 in like manner to the detector 23 comprises a resonant circuit part 50 which comprises an inductor L1 51 and a capacitor C1 54 connected in parallel. A frequency generator 53 is connected to the resonant circuit part 50. The read/write device 31 further comprises an amplitude modulator 54 which is controllable in response to data sent on a write data line 55. The amplitude modulator 54 controls the power of the signal from the frequency generator 53 to the resonant circuit part 50, and thus provides modulation of the amplitude of the power of the signal generated by the resonant circuit part 32 which can be detected by the write data circuit part 42 of the tag 30.

The read/write device 31 further comprises a demodulator, generally shown at 56. The demodulator 46 comprises a splitter 57 connected to the frequency generator 45 to split off a part of the signal to provide a reference signal. A coupler 58 is provided to split off a part of the reflected signal reflected back from the resonant circuit part 50. The reference signal and reflected signal are passed to a multiplier indicated at 59. The multiplier 59 multiplies the reflected signal and the reference signal and passes the output to a low pass filter 60. The low pass filter 60 passes a signal corresponding to the phase difference between the reference signal and the reflected signal to an output 61. By controlling the switch S1 39 of the tag 30 under control of the memory 34, the resonant frequency of resonant circuit part 32 can be modulated and hence the phase of the reflected signal reflected by the resonant circuit part 50 with respect to a reference signal can be modulated. This change of phase is detected by the demodulator 55, and so data can be read from the tag by the read/write device 31. By this method, data may be transmitted from the tag 30 whilst not significantly affecting the power drawn by the resonant circuit part 32.

Figure 4:
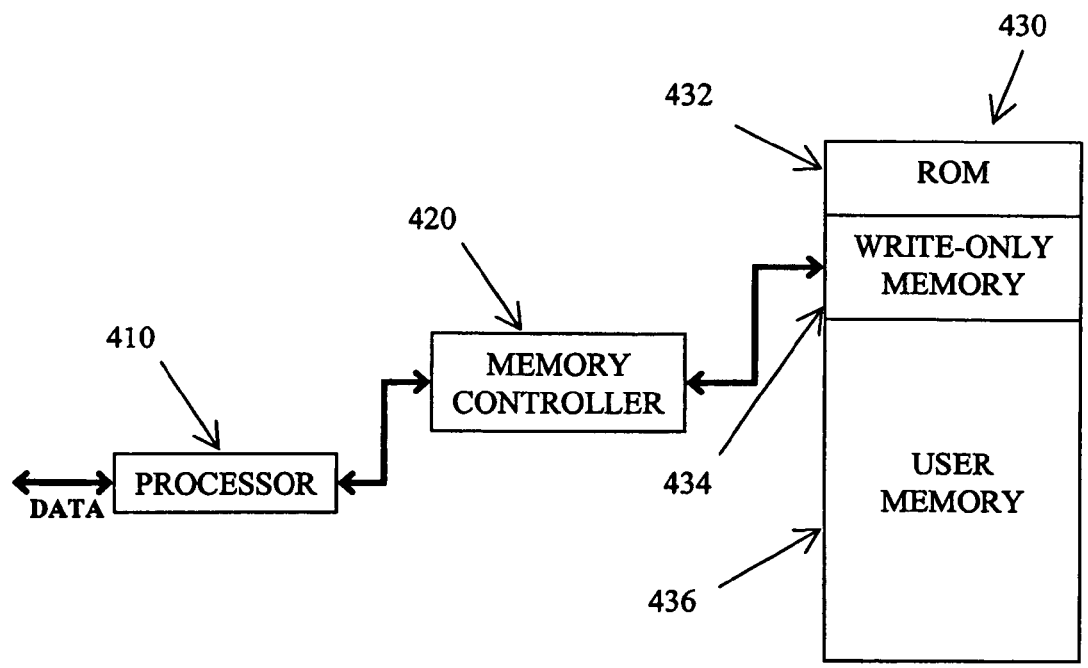
FIG. 4 shows a configuration for control of memory in an exemplary memory tag of a type as shown in FIG. 2 suitable for use for embodiments of the invention.

As indicated above, in some memory tag designs it is desirable for the control circuitry to be provided by a processor (advantageously a purpose designed processor to minimise power demand, though in principle any of a range of low-power processor designs may be employed). This allows for more sophisticated control of the memory in a manner that can be used to advantage in a specific embodiment of the invention described further below. FIG. 4 shows an arrangement in which processor 410 receives and sends data. Communication with non-volatile memory 430 is by means of memory controller 420. The processor 410 (or memory controller 420) is configured such that some areas of memory are read only 432 (this could of course also be done by providing read-only memory, but to reduce cost and complexity it may be preferable to use only one type of memory) containing, for example, code for operation of the processor 410, and that some areas of memory can be written to as well as read from and thus used as user memory 436. A further possibility is to allow some areas of memory to be written to once, but not to be written to subsequently—such write-once memory 434 may be used effectively in embodiments of the invention as discussed below.

Other approaches may be taken to providing write-once memory. One such approach is to physically change the memory tag after data is written to it. This may be achieved by having a part of the write circuitry disposed so that it can be destroyed after relevant data is written to the memory tag (by burning out a link or otherwise). If this approach is taken, a tag which initially has read and write capability is turned into a read-only tag containing specific data.

Figure 5:
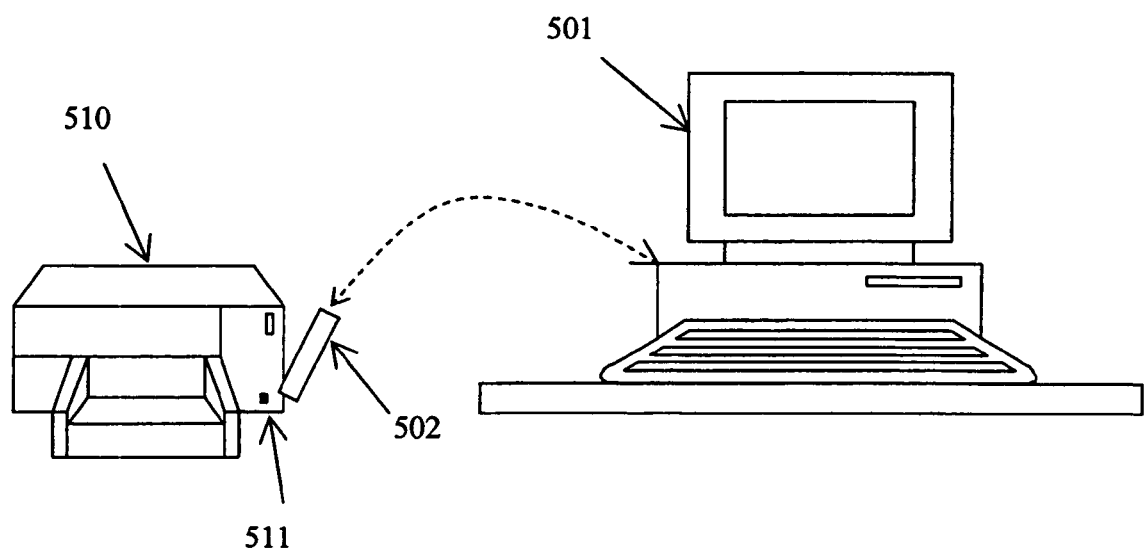
FIG. 5 shows physical elements used in bringing into effect embodiments of the invention.

Use of the memory tag integrated into an object as shown in FIG. 1 will now be discussed in the context of embodiments of the invention. FIG. 5 shows the printer of FIG. 1 at the point of sale—printer 510 is at a checkout counter, checkout being handled through computer 501. Printer 510 has memory tag 511 provided thereon. Memory tag 511 may be blank, or it may already contain information provided by the manufacturer—for example, the memory tag 511 may contain product information such as a manual (either for upload to a computing device of the end user or for partial upload, by first uploading an index and then requesting an upload of a specific manual part). Preferably (for some embodiments of the invention) the memory tag has a unique ID which cannot be altered. The memory tag 511 can be read or written to by a reader device 502 connected to checkout computer 501—in the illustrated case, connection is by short-range wireless (using a protocol such as Bluetooth) but other forms of wired or wireless connections are also possible.

Figure 6:
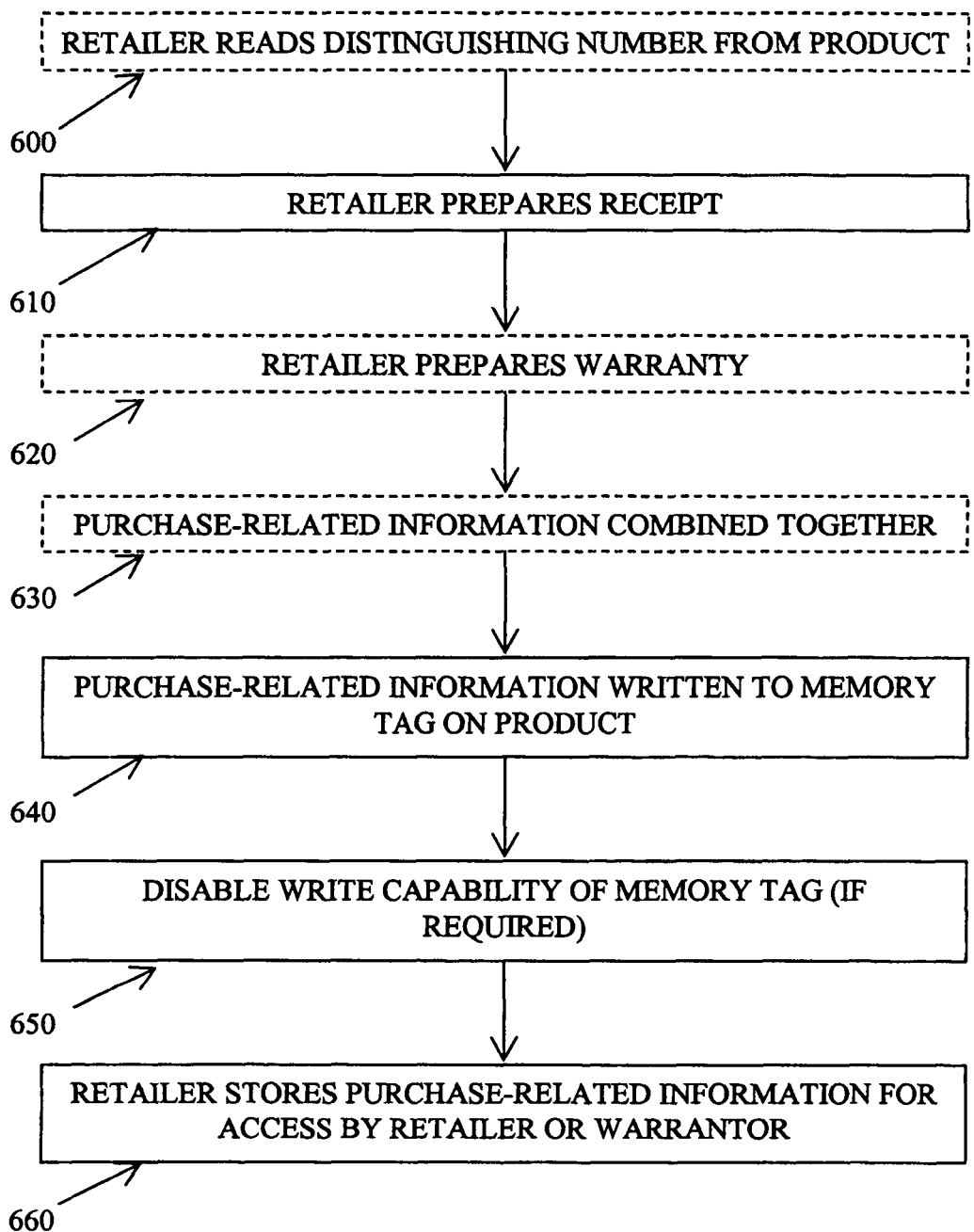
FIG. 6 shows a process for writing purchase-related information on to the memory tag of an object as shown in FIG. 1.

With such an arrangement, it is possible for purchase-related information to be written on to the memory tag at the time of purchase. Such purchase-related information may include a receipt for purchase, and may also include a warranty—or references that are sufficient to prove the existence of a receipt and/or warranty adequately to the retailer or warranty provider or as otherwise necessary. One mechanism for doing this is illustrated in FIG. 6 and discussed below.

A first step 600 (in some approaches) is for the retailer to read a distinguishing number from the product—this could be the unique ID from the memory tag (if present) or could be the serial number of the product, or a combination of the two. The retailer then creates a receipt in electronic form—it may be provided also in paper form, and the electronic form an image of the paper receipt or merely a digital version of its content—and this information is prepared for writing into the memory tag (step 610). If separate warranty information is to be provided (possibly as a separate transaction), then this is also prepared for writing into the memory tag (step 620)—again a written confirmation may be provided if required. Optionally, the information may then be combined together (step 630)— one possibility is for the information to be encoded using the distinguishing number, and to be readable only when the distinguishing number is used to decode it. It is also possible for the information, or a part of the information, to be more strongly encrypted with a first key of the retailer or warranty provider—this means that the user will not be able to read the encrypted part but that the retailer or warranty provider using a second key to decrypt the encrypted part may have more confidence that it has not been modified. In whatever form, the purchase-related information is then written 640 to the memory tag. Where write-once memory is provided in the memory tag, it is preferred that the information is written to such memory to prevent illicit modification. Where the tag is read-write but can be converted to read write by appropriate modification (as discussed above), such a modification is made (step 650) as an alternative to using write-once memory. The retailer may then store purchase-related information (step 660) for access by the retailer itself (or for access by, say, a warrantor)—for example, the retailer may not store the receipt, but may store the warranty against a warranty number and the distinguishing number of the product.

As can be seen from the above, a number of different options are presented for the form of the purchase-related information. The purchase-related information may or may not be available for inspection by the owner (by using their own memory tag reader)—an advantage of allowing inspection is that the owner can readily inspect the data to determine whether a claim is possible, whereas an advantage of preventing inspection (for example, by encrypting the purchase-related information such that a decryption key is not available to the user) or preventing either inspection or wholesale replacement (by encrypting the purchase-related information such that neither an encryption nor a decryption key is available to the user) is that the retailer or warrantor is better protected against false claiming. An approach which allows both advantages to exist is to provide the purchase-related information in two parts—a user-readable part which indicates the information in such a form that the user can determine what claims can be made, and an encrypted part which can be used on claiming by the retailer or warrantor to ensure that no subversion has occurred.

It is possible that there may be a chain of warranty information applying to a product—running from manufacturer to wholesaler to retailer, say—and that this may all be stored directly in the memory tag on the product itself without needing to retain associated paperwork. If there is more than one type of purchase-related information on a memory tag, then use of write-once memory capable of supporting a series of separate write operations may be particularly desirable.

Figure 7:
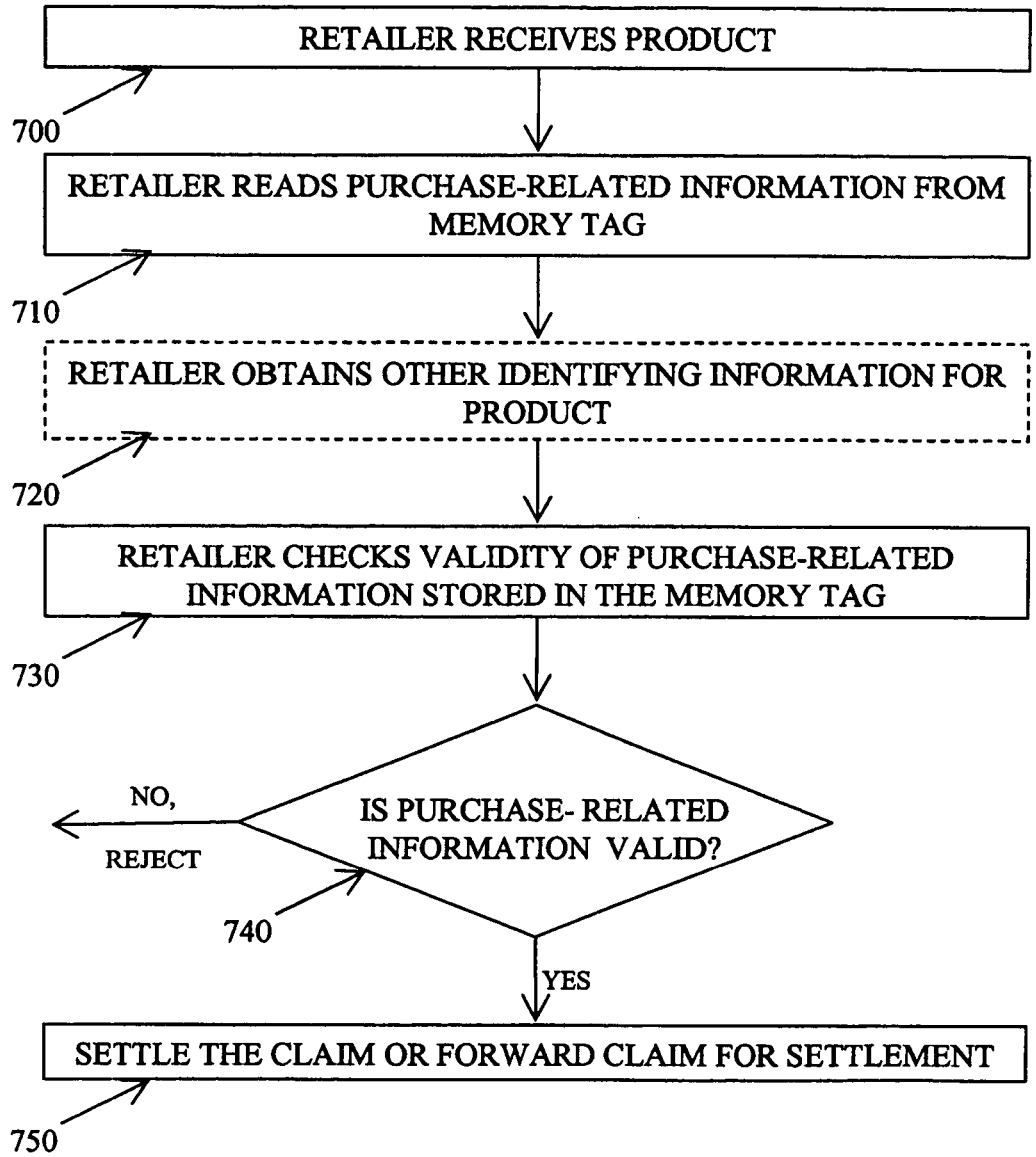
FIG. 7 shows a process for using purchase-related information stored in the memory tag of an object as shown in FIG. 1 to prove a claim.

If a claim needs to be made—for example, if the product is defective and needs to be returned (for which receipt information may be used) or needs a warranty repair—the process illustrated in FIG. 7 can be followed.

The product is first returned 700 to the retailer or another agreed party. An alternative approach is for the owner to communicate over a network with the relevant party (retailer, warrantor), but this has the disadvantage that the next step of reading purchase-related information 710 from the memory tag is under control of the user rather than under control of the retailer (or other agreed party trusted by the retailer or warrantor), thus increasing the risk of subversion. Other information identifying the product—which could be, for example, the unique ID number of the memory tag or the serial number of the product stored either in the memory tag or directly on the product itself—may also be obtained 720 by the retailer or the agreed party at this time. The retailer or agreed party then checks 730 the validity of the purchase-related information—this may be to check that the form of the purchase-related information is correct (it may contain various check data only known to the retailer or associated agreed parties, may be tied to the identifying information, and may be encrypted such that the verifying party needs to use a decryption key to verify it). This check may include determining if the purchase-related information genuinely relates to the information identifying the product (serial number or otherwise) as a defence against fraud. If (step 740) the retailer or agreed party successfully checks the validity of the purchase-related information, the normal processes used to settle (step 750) the claim follow.

The approaches indicated above allow purchase-related information, such as receipts and warranties, to be stored directly on to a product. This solves a standard problem of maintaining such information so that it can be used when required, as it the product is retained, the information is also retained. These approaches also provide for risks of false claiming to be minimised, and make the claiming process relatively straightforward for both product owner and retailer or warrantor.

The invention claimed is:

1. A method comprising:
   receiving, at a memory tag from a read/write device of a computing device, a digital form of purchase-related information, wherein the digital form of the purchase-related information is associated with a purchase of a physical object and describes warranties for the physical object, wherein the memory tag is integrally formed with the physical object or permanently fixed to the physical object, where the described warranties include warranties running between respective pairs of different entities in a chain of distribution of the physical object, where the chain of distribution includes a manufacturer of the physical object, a retailer selling the physical object, and a user of the physical object, and wherein the digital form of the purchase-related information was created in response to the purchase of the physical object or an indication that the physical object will be purchased;
   storing, at the memory tag, the digital form of the purchase-related information, wherein the digital form of the purchase-related information is stored in a memory within the memory tag, the memory configured to only be written to once; and
   encrypting part of the digital form of the purchase-related information, wherein the part of the digital form of the purchase-related information that is encrypted and stored at the memory tag is inaccessible by anyone other than a person providing a warranty service for the physical object.

2. A method according to claim 1, further comprising receiving, with the digital form of the purchase-related information, a serial number of the physical object, and storing the serial number at the memory tag.

3. A method according to claim 1, further comprising encrypting all of the digital form of the purchase-related information, and storing the encrypted all of the digital form of the purchase-related information at the memory tag.

4. A method according to claim 1 wherein the digital form of the purchase-related information further comprises a receipt of the purchase.

5. A method according to claim 1 wherein the digital form of the purchase-related information stored at the memory tag further comprises a product manual for the physical object.

6. A method according to claim 1, further comprising:
   physically changing the memory tag after the memory has been written with the digital form of the purchase-related information, wherein physically changing the memory tag renders the memory read-only.

7. A method according to claim 1, wherein the part of the digital form of the purchase-related information in the memory is encrypted with a first key, and wherein the encrypted part of the digital form of the purchase-related information is decryptable using a second, different key.

8. A method according to claim 1, wherein the different entities in the chain of distribution further include a wholesaler between the manufacturer and the retailer.

9. An apparatus comprising:
a physical object;
a memory tag integrally formed with the physical object or permanently fixed to the physical object, the memory tag having a memory and configured to:
receive, from a read/write device associated with a computing device, a digital form of purchase-related information that is associated with a purchase of the physical object and describes warranties for the physical object, the warranties running between respective pairs of different entities in a chain of distribution of the physical object, where the chain of distribution includes a manufacturer of the physical object, a retailer selling the physical object, and a user of the physical object, and wherein the digital form of the purchase-related information is created in response to the purchase of the physical object or an indication that the physical object will be purchased; and
store the digital form of the purchase-related information in the memory, the memory configured to only be written to once, and wherein at least a part of the digital form of the purchase-related information stored in the memory is encrypted with a first key and is inaccessible by anyone other than a person providing a warranty service for the physical object.

10. An apparatus according to claim 9, wherein the digital form of the purchase-related information further comprises a serial number of the physical object.

11. An apparatus according to claim 9, wherein the encrypted part of the digital form of the purchase-related information is decryptable using a second, different key.

12. An apparatus according to claim 9, wherein all of the digital form of the purchase-related information stored in the memory is encrypted.

13. An apparatus according to claim 9, wherein the digital form of the purchase-related information further comprises a receipt of the purchase.

14. An apparatus according to claim 9, wherein the digital form of the purchase-related information further comprises a product manual for the physical object.

15. An apparatus according to claim 9, wherein a portion of the memory tag is to be physically changed after the memory has been written with the digital form of the purchase-related information, wherein the physical changing of the memory tag renders the memory read-only.

16. A method comprising:
receiving, at a memory tag from a read/write device of a computing device, a digital form of purchase-related information, wherein the digital form of the purchase-related information is associated with a purchase of a physical object and describes warranties for the physical object, wherein the memory tag is integrally formed with the physical object or permanently fixed to the physical object, where the described warranties include warranties running among different entities in a chain of distribution of the physical object, where the chain of distribution includes a manufacturer of the physical object, a retailer selling the physical object, and a user of the physical object, and wherein the digital form of the purchase-related information was created in response to the purchase of the physical object or an indication that the physical object will be purchased;
storing, at the memory tag, the digital form of the purchase-related information, wherein the digital form of the purchase-related information is stored in a memory within the memory tag, the memory configured to only be written to once;
encrypting part of the digital form of the purchase-related information, wherein the part of the digital form of the purchase-related information that is encrypted and stored at the memory tag is inaccessible by anyone other than a person providing a warranty service for the physical object; and
physically changing the memory tag after the memory has been written with the digital form of the purchase-related information, wherein physically changing the memory tag renders the memory read-only, wherein physically changing the memory tag comprises burning a link in write circuitry of the memory tag.

17. An apparatus comprising:
a physical object;
a memory tag integrally formed with the physical object or permanently fixed to the physical object, the memory tag having a memory and configured to:
receive, from a read/write device associated with a computing device, a digital form of purchase-related information that is associated with a purchase of the physical object and describes warranties for the physical object, the warranties running among different entities in a chain of distribution of the physical object, where the chain of distribution includes a manufacturer of the physical object, a retailer selling the physical object, and a user of the physical object, and wherein the digital form of the purchase-related information is created in response to the purchase of the physical object or an indication that the physical object will be purchased; and
store the digital form of the purchase-related information in the memory, the memory configured to only be written to once, and wherein at least a part of the digital form of the purchase-related information stored in the memory is encrypted with a first key and is inaccessible by anyone other than a person providing a warranty service for the physical object, wherein a portion of the memory tag is to be physically changed after the memory has been written with the digital form of the purchase-related information, wherein the physical changing of the memory tag renders the memory read-only, and wherein the memory tag comprises write circuitry having a link to be burned to physically change the memory tag to render the memory read-only.

18. A system comprising:
a computing device configured to:
create a digital form of purchase-related information, wherein the digital form of the purchase-related information is associated with a physical object, and wherein creating the digital form of the purchase-related information is in response to a purchase of the physical object or an indication that the physical object will be purchased; and
a read/write device configured to:
output the digital form of the purchase-related information, wherein the digital form of the purchase-related information comprises information relating to a warranty associated with the physical object, wherein the information relating to the warranty describes warranties running among different entities in a chain of distribution of the physical object, wherein the chain of distribution includes a manufacturer of the physical object, a retailer selling the physical object, and a user of the physical object, and wherein the described warranties include warranties between respective pairs of the different entities in the chain of distribution, the different entities including the manufacturer, the retailer, and the user, wherein the computing device is configured to encrypt, with a key, at least the information relating to the warranty, wherein the output of the digital form of the purchase-related information causes the digital form of the purchase-related information to be stored at a memory tag associated with the physical object, and wherein the encrypted information of the digital form of the purchase-related information as stored at the memory tag is not available for access by anyone other than a person providing warranty service for the physical object.

19. A system according to claim 18, wherein the computing device is further configured to output electronically, with the digital form of the purchase-related information, a serial number of the physical object.

\* \* \* \* \*